United States Patent
Stillger et al.

(10) Patent No.: US 9,621,010 B2
(45) Date of Patent: Apr. 11, 2017

(54) ROTATING ELECTRICAL MACHINE

(75) Inventors: Reinhard Stillger, Öhringen (DE); Christian Pfaff, Künzelsau (DE); Jens Krotsch, Niederstetten (DE); Martin Baun, Mulfingen (DE); Martin Baer, Mulfingen (DE); Tobias Ehmann, Neuenstein (DE); Mark Heinze, Rot am See (DE); Reinhold Gerner, Ravenstein (DE); Christian Hammel, Pfedelbach-Oberohrn (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 342 days.

(21) Appl. No.: 14/344,678

(22) PCT Filed: Sep. 12, 2012

(86) PCT No.: PCT/EP2012/067775
§ 371 (c)(1),
(2), (4) Date: May 14, 2014

(87) PCT Pub. No.: WO2013/037797
PCT Pub. Date: Mar. 21, 2013

(65) Prior Publication Data
US 2014/0306559 A1    Oct. 16, 2014

(30) Foreign Application Priority Data

Sep. 14, 2011 (DE) .......................... 10 2011 053 611

(51) Int. Cl.
H02K 9/00 (2006.01)
H02K 9/16 (2006.01)
(Continued)

(52) U.S. Cl.
CPC .................. *H02K 9/16* (2013.01); *H02K 5/18* (2013.01); *H02K 9/08* (2013.01); *H02K 9/14* (2013.01); *H02K 9/22* (2013.01)

(58) Field of Classification Search
CPC ................................... H02K 5/18; H02K 9/00
(Continued)

(56) References Cited

U.S. PATENT DOCUMENTS

| 3,226,580 A | 12/1965 | Oehlrich et al. |
| 3,518,467 A | 6/1970 | Wightman |
| 2004/0150270 A1* | 8/2004 | Nagayama ............... H02K 1/32 310/61 |

FOREIGN PATENT DOCUMENTS

| CN | 1304203 A | 7/2001 |
| DE | GB 276433 | 4/1928 |

(Continued)

OTHER PUBLICATIONS

PCT International Search Report—Oct. 16, 2013.

*Primary Examiner* — Jose Gonzalez Quinones
(74) *Attorney, Agent, or Firm* — Brinks Gilson & Lione (57) ABSTRACT

A rotating electric machine (1) having a stator (4) in a housing (2) and a rotor (10) supported by a shaft (6). The housing (2) circumferential wall (12) and first and second axially opposing end walls (14, 16) support bearing flanges with bearings (18) for the shaft (6). Two cooling fan impellers (20, 22) are connected to the shaft (6). An inner cooling fan impeller (20) positioned inside the housing (2) generates an inner cooling air circuit (A) inside the housing (2). An outer cooling fan impeller (22) provided outside the housing (2), generates an outer cooling air flow (B). The first end wall (14) is formed with a thermal conductivity of at least a specified value and has an outer cooling rib geometry (28) on its outer side facing the outer cooling fan impeller (22), (Continued)

and an inner cooling rib geometry (30) on its opposing inner side.

11 Claims, 6 Drawing Sheets

(51) Int. Cl.
  *H02K 5/18* (2006.01)
  *H02K 9/08* (2006.01)
  *H02K 9/14* (2006.01)
  *H02K 9/22* (2006.01)
(58) Field of Classification Search
  USPC .................. 310/52, 55, 58–59, 60 R, 62–63
  See application file for complete search history.

(56) References Cited

FOREIGN PATENT DOCUMENTS

| | | |
|---|---|---|
| DE | CH 144 107 A | 3/1931 |
| DE | CH 147 560 A | 8/1931 |
| DE | GB 754781 A | 8/1956 |
| DE | 11 28 023 B | 4/1962 |
| DE | 19 43 361 A1 | 6/1970 |
| DE | 690 04 834 T2 | 4/1994 |
| DE | 102009046192 A1 * | 5/2011 ............... H02K 5/15 |
| EP | 0 387 743 A1 | 12/1990 |
| EP | 1 100 182 A1 | 5/2001 |
| EP | 1100182 A1 * | 5/2001 ............... H02K 5/18 |
| EP | 1 768 234 A1 | 3/2007 |
| GB | 2 283 371 A | 5/1995 |
| JP | 2006-25521 | 1/2006 |
| JP | 2006025521 A * | 1/2006 |

* cited by examiner

ROTATING ELECTRICAL MACHINE

CROSS REFERENCE TO RELATED APPLICATION

This application claims priority to German patent application number 10 2011 053 611.6, filed Sep. 14, 2011 and PCT/EP2012/067775, filed on Sep. 12, 2012.

FIELD OF THE INVENTION

The present invention relates to a rotating electric machine including a stator disposed in a housing and a rotor rotatably supported by a shaft about an axis of rotation, wherein the housing has a circumferential wall and two axially opposing end walls formed as bearing flanges having rotating-element bearings for the shaft, and wherein two cooling fan impellers are connected to the shaft, specifically on the one hand an inner cooling fan impeller inside the housing, which inner cooling fan impeller upon rotation generates an inner cooling air circuit inside the housing, and on the other hand an outer cooling fan impeller outside the housing, which outer cooling fan impeller upon rotation generates an outer cooling air flow flowing over the housing.

It is expressly noted that the term "rotating electric machine" includes both an embodiment as generator and an embodiment as a motor.

BACKGROUND

Document EP 1 768 234 A1 describes an electric machine of the above-described type, wherein it is specifically a motor and a completely enclosed and fan-cooled embodiment. In this known embodiment, the inner cooling fan impeller is disposed on the side of the stator and of the rotor facing towards the outer cooling fan impeller, so that the two cooling fan impellers are separated from each other by the one first end wall of the housing.

The document EP 0 387 743 B1 or the corresponding publication DE 690 04 834 T2 also describes a very similar instance of prior art, namely a closed, air-cooled electric motor. In this case, however, the inner cooling fan impeller is disposed on the other side of the rotor and of the stator, which other side lies at a distance from the outer cooling fan impeller.

The object of the present invention is to further improve the cooling and at the same time in particular the heat dissipation from the interior of the housing to the outside.

This is inventively achieved by the features described herein.

SUMMARY

According to the invention it is therefore provided that the first end wall of the housing, which first end wall is disposed on the side of the outer cooling fan impeller between this cooling fan impeller and the inner cooling air circuit, is formed with a high thermal conductivity of at least $$100 \frac{W}{m \cdot K},$$

and has an outer cooling rib geometry on its outer side facing towards the outer cooling fan impeller as well as an inner cooling rib geometry on its opposing inner side.

Due to this advantageous embodiment, the heat transfer between the inner cooling air circuit and the outer cooling air flow is significantly improved. The air set in motion inside the housing picks up the internal heat and effectively delivers this via the inner cooling rib geometry to the first end wall. Due to the high thermal conductivity, the end wall further delivers the heat via the outer cooling rib geometry effectively outward to the cooling air flow, so that the heat is very effectively released into the environment.

In the context of the invention, the term "good thermal conductivity" indicates a thermal conductivity $\lambda$ of at least $$100 \frac{W}{m \cdot K},$$

but in particular at least $$150 \frac{W}{m \cdot K}.$$

In a preferred design, at least the first end wall having the cooling rib geometries on both sides is comprised of aluminum, in particular die-cast aluminum, wherein the term "aluminum" also includes an aluminum alloy, so that the thermal conductivity—depending on the alloy—lies in the range of $$150 \text{ to } 240 \frac{W}{m \cdot K}.$$

In a further advantageous embodiment, the circumferential wall of the housing is also formed of an appropriate material having good thermal conductivity, in particular aluminum. In addition the opposing second end wall can also advantageously be comprised of aluminum, so that an effective heat transfer via a metallic machine mount connected to the second end wall can also be achieved in this region.

BRIEF DESCRIPTION OF THE DRAWINGS

The invention shall be explained more precisely below based on a preferred embodiment illustrated in the drawings.

In the various figures of the drawings, identical parts are always provided with identical reference numbers.

DETAILED DESCRIPTION

Figure 2:
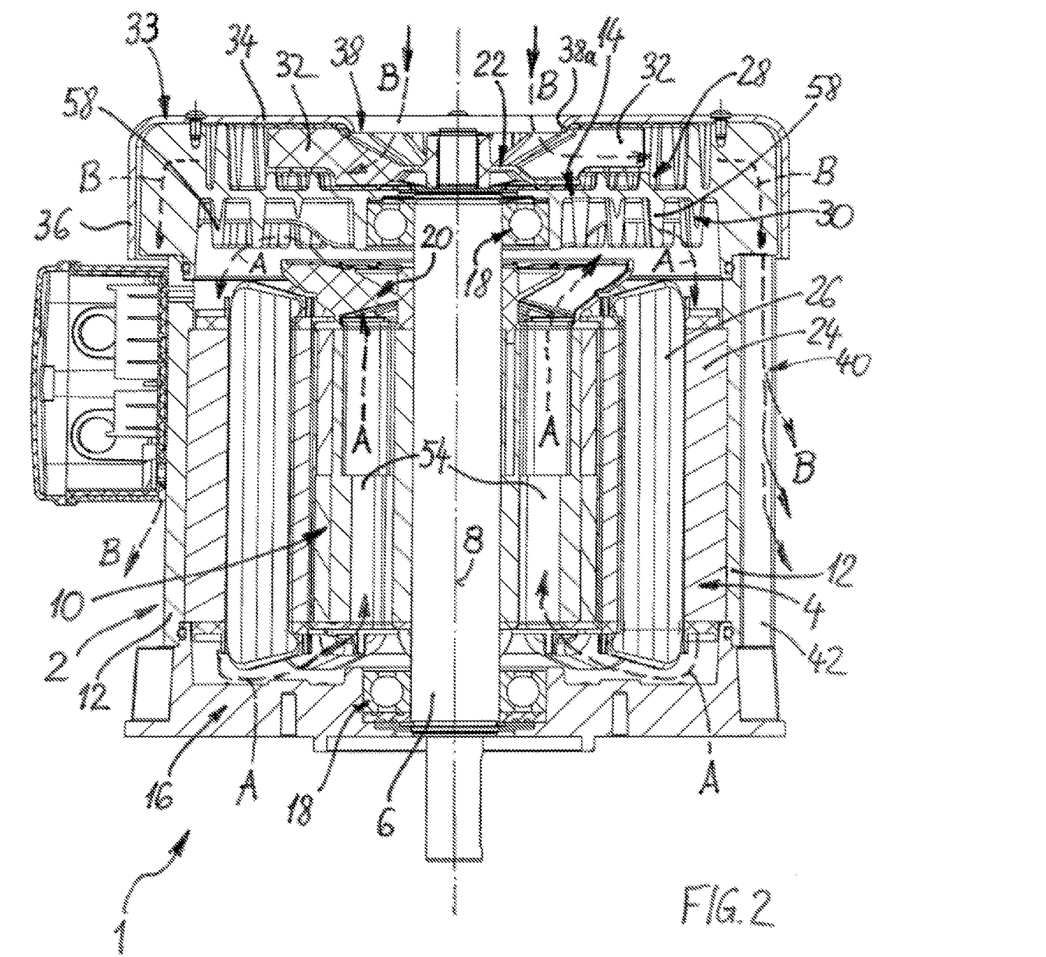
FIG. 2 shows an axial section of the machine in a diametric section plane illustrated in FIG. 1 by an intersecting line II-II.
Figure 3:
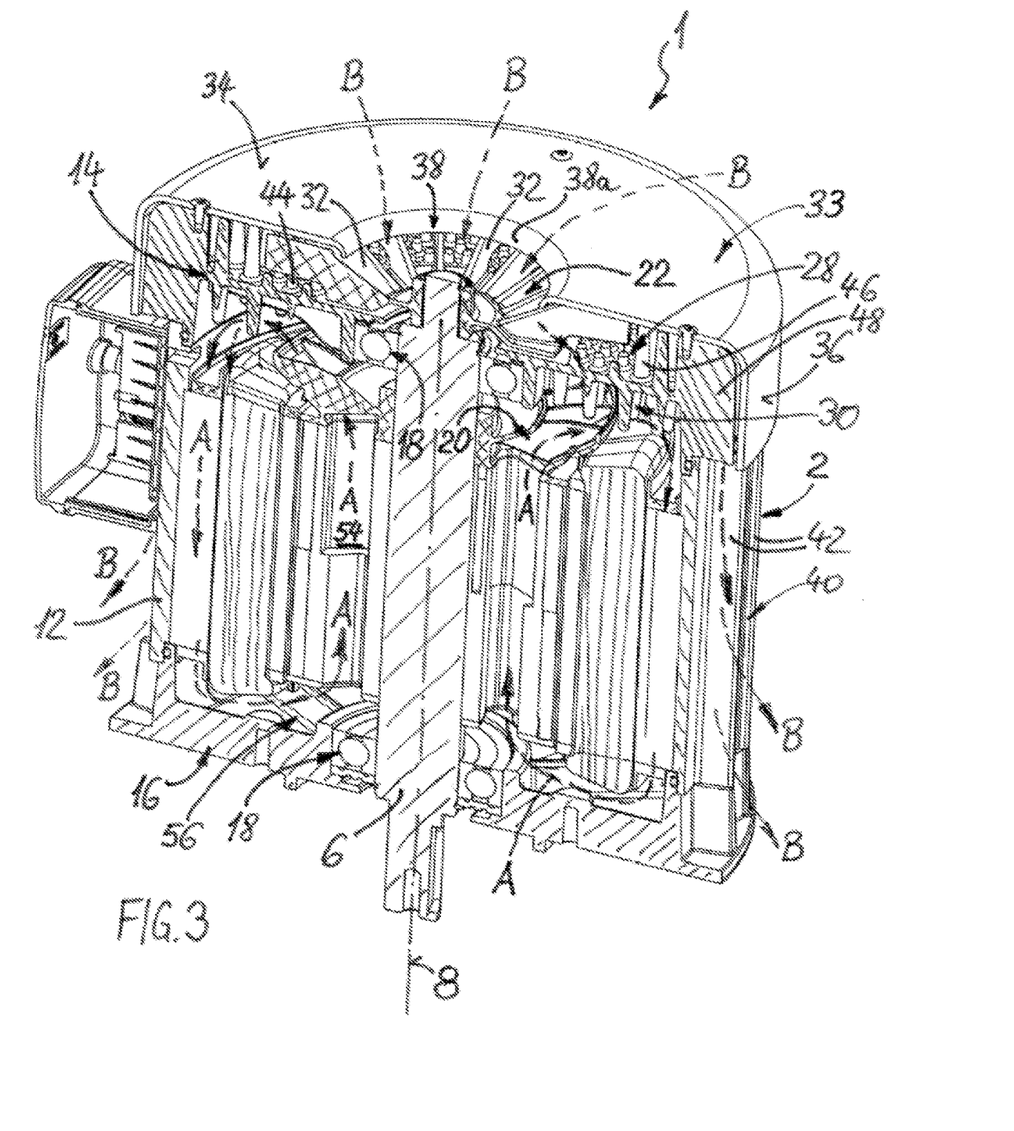
FIG. 3 shows a diametrically-cut perspective view, corresponding to FIG. 2, of the inventive machine.
Figure 5:
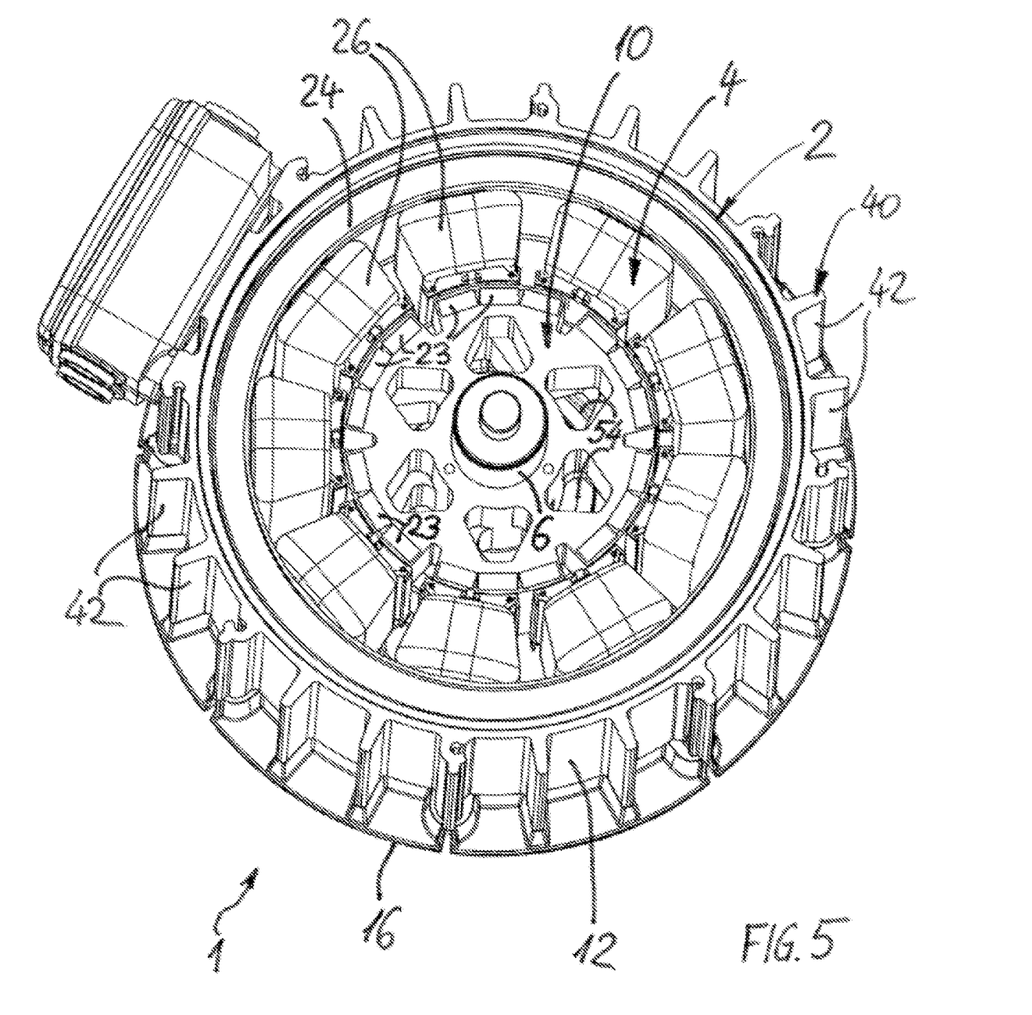
FIG. 5 shows a perspective view of the machine without the first end wall, for access to the region of the stator and rotor, as well as without the inner cooling fan impeller.

An inventive rotating electric machine 1, in an embodiment as generator or motor, has a stator 4 and a rotor 10 rotatably supported by a shaft 6 about an axis of rotation 8, which stator 4 and rotor 10 are disposed in a closed housing 2. In. FIGS. 2 and 3, and also in FIG. 5, reference is made to these internal components of the machine 1. In addition, the rotor 10 is shown with the shaft 6 separately in FIGS. 6 and 7.

The machine 1 is completely enclosed by the closed housing 2, so that it corresponds to a high IP protection class, in particular IP 54.

The housing 2 is comprised of a circumferential wall 12 coaxially surrounding the rotor 10 and the stator 4, and two axially-opposing end walls 14 and 16. These end walls 14 and 16 are formed as bearing flanges with rotating-element bearings 18 for the shaft 6. In the example shown, the rotating-element bearings 18 are ball bearings which surround the shaft 6 and each sit in a receptacle of the respective end wall 14 and 16.

For self-cooling of the electric machine 1, two cooling fan impellers 20 and 22 are connected to the shaft 6, specifically, on the one hand an inner cooling fan impeller 20 inside the housing 2, and on the other hand an outer cooling fan impeller 22 outside the housing 2. Hence, upon rotation of the rotor 10, both cooling fan impellers 20 and 22 are co-rotated. Upon rotation the inner cooling fan impeller 20 generates an inner cooling air circuit which is illustrated in FIGS. 2 and 3 by dashed arrows A. Upon rotation the outer cooling fan impeller 22 generates an outer cooling air stream flowing over the housing 2, which outer cooling air stream is indicated in FIGS. 2 and 3 by dashed arrows B.

In the illustrated embodiment, the electric machine 1 is formed as an internal-rotor machine, wherein the rotor 10 as internal rotor is enclosed by the stator 4 and rotates inside the stator 4. The rotor 10 includes permanent magnets 23 (see in particular FIG. 5). The stator 4 is includes of a stator core 24 formed as a plate package and stator windings 26.

According to the invention it is now provided that the first end wall 14 of the housing 2, which first end wall 14 is disposed on the side of the outer cooling fan impeller 22 between the latter and the inner cooling air circuit A, is formed with a high thermal conductivity of at least $$100 \frac{W}{m \cdot K}$$

and has an outer cooling rib geometry 28 on its outer side facing towards the outer cooling fan impeller 22, and an inner cooling rib geometry 30 on its opposing inner side. Thus the first end wall 14 is inventively formed as a cooling body which very effectively absorbs heat from the inner cooling air circuit A, guides it outward, and there releases it to the outer cooling air flow B.

In order to achieve the good thermal conductivity, the first end wall 14 is preferably made of aluminum, specifically in particular as a one-piece die-cast aluminum part. The general term "aluminum" also includes aluminum alloys. Pure, nearly 100% aluminum is known to have a thermal conductivity in the range of $$\lambda_{Al} = 236 \frac{W}{m \cdot K},$$

and in the case of an aluminum alloy the thermal conductivity lies in the range of $$150 \text{ to } 240 \frac{W}{m \cdot K}.$$

In a preferred design, also the circumferential wall 12, more preferably also the second end wall 16, are formed of aluminum. In this way an additional effective heat transfer can be achieved in the region of the second end wall 16 via a metallic machine mount (not shown) connected to the second end wall 16.

Figure 1:
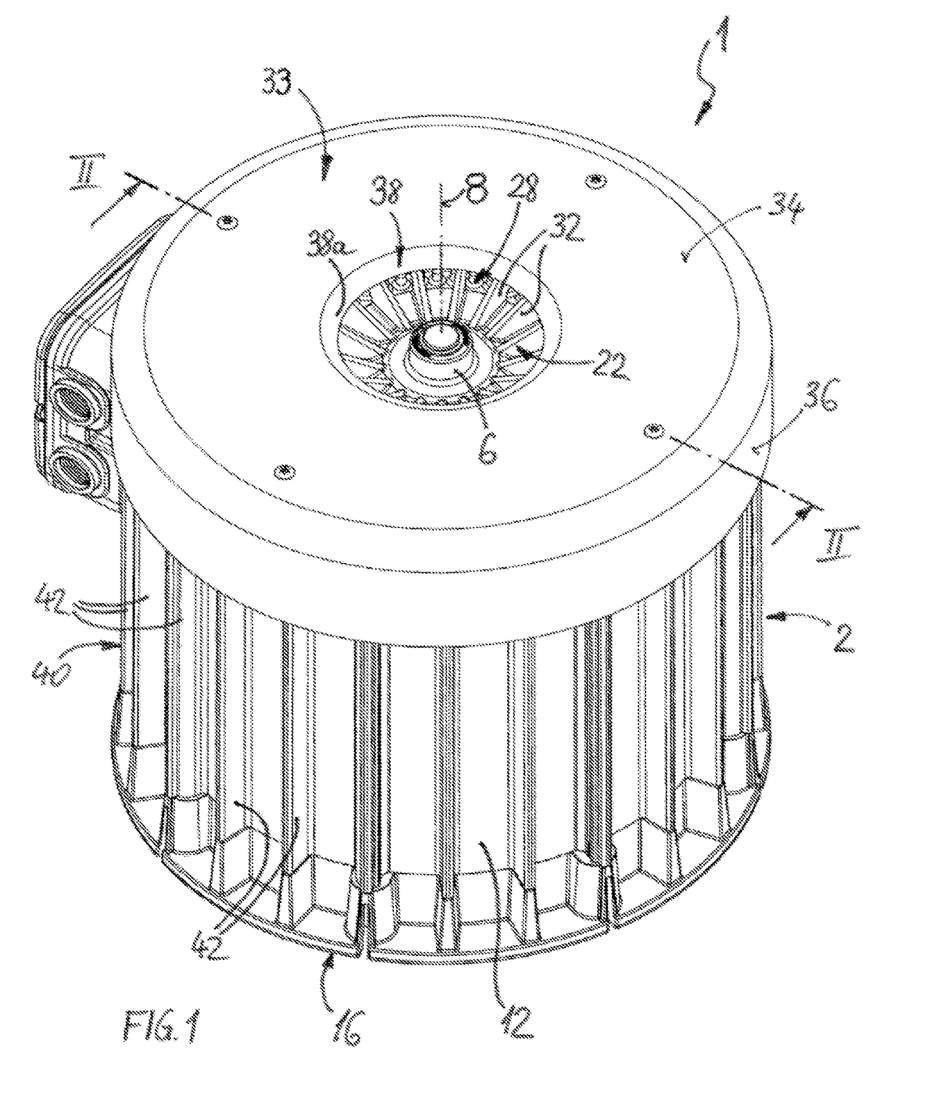
FIG. 1 shows a perspective view of an inventive electric machine.

The outer cooling fan impeller 22 is advantageously formed as a radial impeller with radial blades 32, wherein the blades 32 lie with their blade surfaces in radially- and axially-aligned planes. According to FIGS. 1 to 3, a cap-like cover 33 is placed on the first end wall 14, covering the cooling rib geometry of which end wall 14 and the cooling fan impeller 22, which cap-like cover 33 is comprised of a cap wall 34 perpendicular to the axis of rotation 8 and an axial circumferential wall 36 extending from this cap wall 34, which circumferential wall 36 circumferentially overlaps the first end wall 14 in the axial direction. The end-side cap wall 34, which is perpendicular to the axis of rotation 8, has a central air inlet opening 38. This air inlet opening 38 can have an opening edge 38a extending in a nozzle-like manner to the outer cooling fan impeller 22.

According to the invention the outer cooling fan impeller 22 in connection with the cover 33 and the outer cooling rib (28) geometry of the first housing end wall 14 are formed such that upon rotation, ambient air is drawn in axially from outside through the air inlet opening 38 of the cover 33, this air flows radially outward through the cooling rib geometry 28 and in the radial outer region is redirected in an axial direction over the cover 33, and finally flows out over the housing circumferential wall 12 and thus reaches the open air again. In this way heat is released to the outside.

In this case it is advantageous if the circumferential wall 12 of the housing 2 also has a cooling rib geometry 40 on its outer side, which preferably, at least predominantly, is formed of elongated, radially projecting and axially extending cooling ribs 42.

As for the outer cooling rib geometry 28 of the first end wall 14, it can in principle be any geometry or topography increasing the surface for effective heat transfer, for example also elongated and axially projecting, in particular at least partially radially aligned cooling ribs. In the illustrated, preferred embodiment however, it is provided that the outer cooling rib geometry 28 is formed of pin-type cooling projections 44 in a radially inner region of the first end wall 14, which region is covered by the outer cooling fan impeller 22 upon rotation, which pin-type cooling projections 44 project axially as far as the vicinity of the rotational plane of the cooling fan impeller 22, which rotational plane is defined by the edges of the blades 32, which edges are facing towards the pin-type cooling projections 44. There is a plurality of cooling projections 44 which are disposed in an annular surface region of the end wall 14.

Furthermore the outer cooling rib geometry 28 is preferably formed in an annular surface region of the first end wall 14, also from pin-like cooling projections 46 which project axially further to the cap wall 34 of the cover 33 and are thus longer cooling projections 46; the annular surface region is adjacent radially outward to the rotation region of the outer cooling fan impeller 22. These cooling projections 46 are also disposed in large quantities over the annular surface region.

Figure 4:
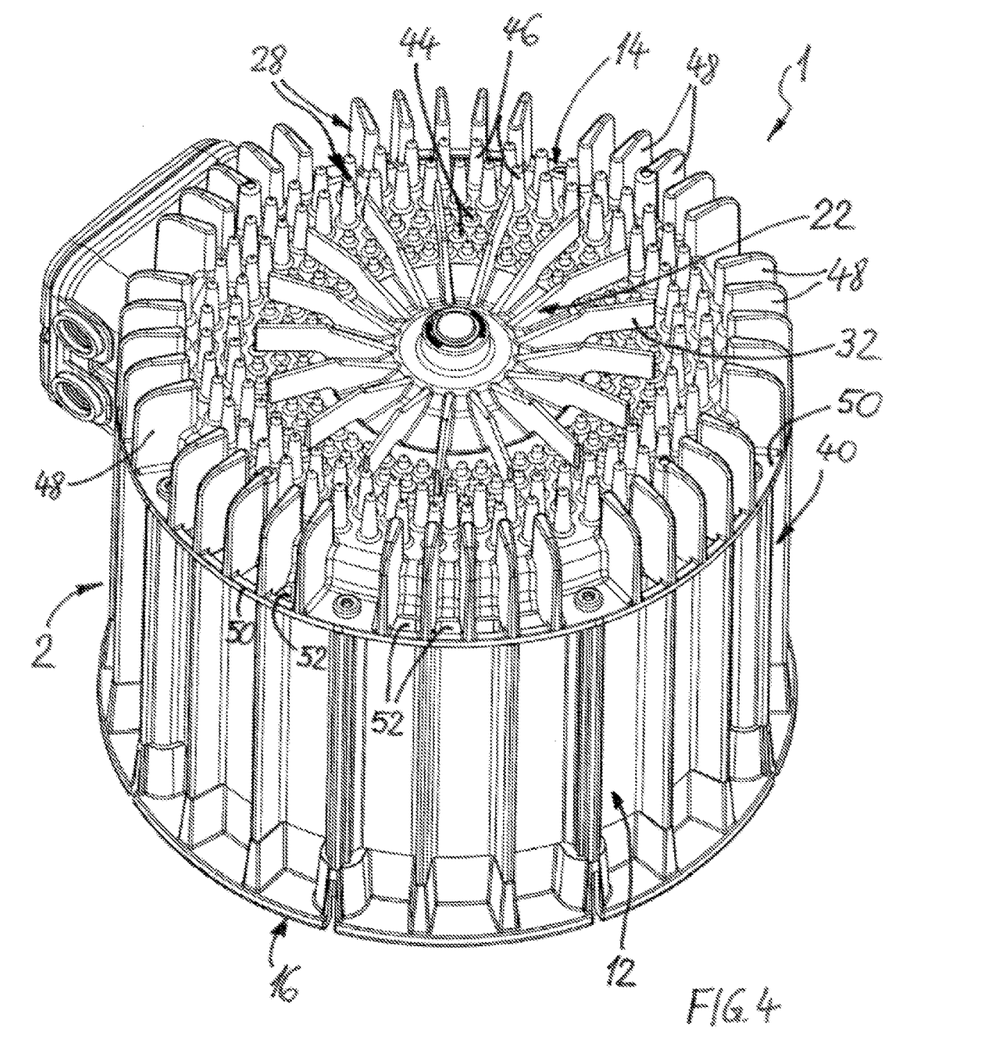
FIG. 4 shows a perspective view analogous to FIG. 1, but without a cap-like cover in the region of the outer cooling fan impeller and the outer cooling rib geometry.

Finally, the outer cooling rib geometry 28 is formed in a radially outer, annular surface region of the first end wall 14 from a plurality of wing-shaped, axially and radially oriented rib projections 48. In the fitted state of the cover 33, see in particular FIGS. 2 and 3, the rib projections 48 lie in the inner transition region between the cap wall 34 and the circumferential edge 36 of the cover 33. The air of the outer cooling flow B flowing approximately radially from inside to outside flows radially between the rib projections 48, whereby flow spin is eliminated and the cover 33 redirects the air stream from the radial direction to an axial direction. Since the first end wall 14 has air openings 52 (see FIG. 4) in an outer edge region 50 projecting radially beyond the adjacent circumferential wall 12 between each of the wing-like rib projections 48, the cooling air can continue to flow away in the axial or axis-parallel direction over the circumferential wall 12.

The design of the outer cooling rib geometry 28 shown and described as preferred advantageously permits, independent of the direction of rotation of the rotor 10, a through-flow from the radially inner region outward, wherein the wing-shaped rib projections 48 serve for air guidance, and acting with the cover 33 redirect the air, eliminate the spin of the air flow B, which spin results from the rotation. Advantageously, this effect of the rib projections 48 due to their radial orientation is also independent of the direction of rotation.

As to the inner cooling fan impeller 20, this can also be formed as a radial impeller. However, in the preferred embodiment it is a diagonal impeller. Upon rotation the inner cooling fan impeller 20 causes the inner cooling air circuit A to pass through axial cooling channels 54 of the rotor 10, via the inner cooling rib geometry 30 of the first end wall 14, in particular through gaps of the stator 4, which gaps are formed between the stator core 24 and the stator windings 26, as well as preferably via an additional cooling rib geometry 56 on the inner side of the second end wall 16; see in particular FIG. 3. The cooling rib geometry 56 of the second end wall 16 can be formed of any cooling projections that can also act mechanically as reinforcing ribs. The inner cooling rib geometry 30 of the first end wall 14 is formed at least partially from pin-type, axially projecting cooling projections 58, whereby independence from the direction of rotation is also achieved.

All cooling projections 44, 46, 48, and 58 of the/each end wall 14 and 16 are formed with a cross-section tapering in the axial direction towards their free end such that the particular end wall 14 or 16 can be manufactured as a one-piece molded part, in particular as a die-cast metal part, with simple axial demolding. With respect to their cross-section, the pin-type cooling projections 44, 46, 58 have a ratio of their radially measured cross-section length l to the cross-section width b, perpendicular to the cross-section length l preferably between 0.8 and 1.5, i.e. l:b=0.8 to 1.5. Preferably it can be a circular or polygonal cross-section having the ratio l:b≈1. However, the wing-shaped rib projections 48 have a cross-section ratio l:b between 1.5 and 6.0.

Finally it should be noted that in the preferred embodiment of the electric machine 1 the inner cooling fan impeller 20 is disposed on the side of the rotor 10 facing towards the first end wall 14. In principle, however, alternatively it can also lie on the other side of the rotor 10, facing towards the end wall 16.

Figure 6:
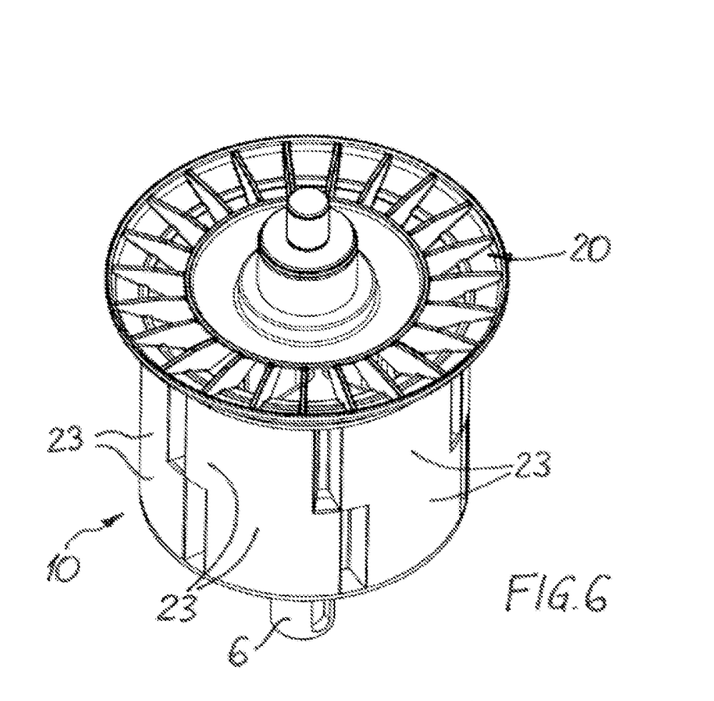
FIG. 6 shows a separate perspective view of the rotor on the side of the inner cooling fan impeller.
Figure 7:
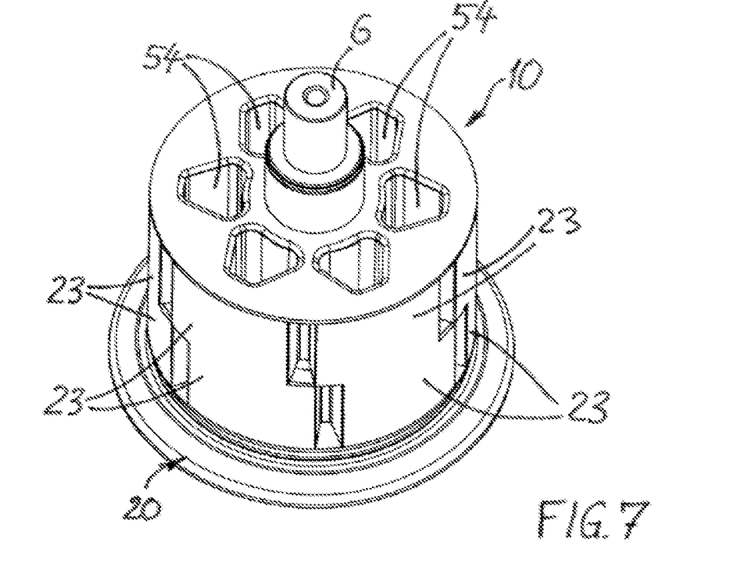
FIG. 7 shows a separate perspective view of the rotor on the other side opposite the inner cooling fan impeller.

As is also clear from FIGS. 6 and 7, the rotor 10 is formed of two sections axially adjacent to each other, which are skewed with respect to one another with the permanent magnets 23 in the circumferential direction by an angle of up to 20°. The cooling channels 54 are disposed in an axially continuous manner in the radially inner, magnetically inactive region of the rotor 10.

The invention is not limited to the exemplary embodiments shown and described, but also includes all embodiments which work in the same way in the sense of the invention. It is emphasized that the exemplary embodiments are not limited to all features in combination, but rather each individual partial feature can also have inventive significance in isolation from all other partial features. Furthermore, the invention is so far not yet limited to the combinations of features defined , but rather can also be defined by any other combination of specific features of all of the individual features disclosed.

While the above description constitutes the preferred embodiment of the present invention, it will be appreciated that the invention is susceptible to modification, variation and change without departing from the proper scope and fair meaning of the accompanying claims.

The invention claimed is:
1. A rotating electric machine (1) comprising a stator (4) disposed in a housing (2) and a rotor (10) rotatably supported by a shaft (6) about an axis of rotation (8), wherein the housing (2) has a circumferential wall (12) and two axially opposing first and second end walls (14, 16) formed as bearing flanges having rotating-element bearings (18) for the shaft (6), and wherein an inner and an outer cooling fan impeller (20, 22) are connected to the shaft (6), the inner cooling fan impeller (20) disposed inside the housing (2), which inner cooling fan impeller (20) upon rotation generates an inner cooling air circuit (A) inside the housing (2), and the outer cooling fan impeller (22) disposed outside the housing (2), which upon rotation generates an outer cooling air flow (B) flowing over the housing (2), wherein the first end wall (14) disposed on the side of the outer cooling fan impeller (22) has an outer cooling rib geometry (28) on an outer side facing towards the outer cooling fan impeller (22) as well as an inner cooling rib geometry (30) on an opposing inner side, wherein the outer cooling fan impeller (22) is formed as a radial impeller with radial blades (32), wherein on the first end wall (14) a cap-like cover (33) is fitted, overlapping the cooling rib geometry (28) of which first end wall (14) and the cooling fan impeller (22), which has a central air inlet opening (38) in a cap wall (34) perpendicular to the axis of rotation (8) and circumferentially surrounds the first end wall (14) with an axial circumferential edge (36) extending from the cap wall (34), wherein the outer cooling fan impeller (22) in connection with the cover (33) is formed such that upon rotation, air drawn in axially through the air inlet opening (38) of the cover (33) flows radially outward through the outer cooling rib geometry (28) and is redirected in an axial direction in the radial outer region over the cover (33) and flows outward over the housing circumferential wall (12), the first end wall (14) is formed with a high thermal conductivity of at least $$100 \frac{W}{m \cdot K}$$

and the outer cooling rib geometry (28) of the first end wall (14) is formed in a radially inner region of the first end wall (14), which region is covered upon rotation by the outer cooling fan impeller (22), of cooling projections (44) projecting axially up to the vicinity of the outer cooling fan impeller (22), and formed, in a radially outer region of the first end wall (14), which radially outer region is adjacent to the region of rotation of the outer cooling fan impeller (22), from the cooling projections (46) projecting axially up to the cover (33), and formed, in a radially outer region of the first end wall (14) from wing-shaped axially and radially oriented rib projections which lie in the inner transition region between the cap wall (34) and the circumferential edge (36) of the cover (33).

2. The electric machine according to claim 1, further comprising in that at least the first end wall (14) of the housing (2), and at least the circumferential wall (12), is comprised of aluminium having good thermal conductivity.

3. The electric machine according to claim 1 further comprising in that the circumferential wall (12) of the housing (2) has a cooling rib geometry (40) on the outer side, which cooling rib geometry (40) is comprised at least predominantly of elongated, radially projecting and axially extending cooling ribs (42).

4. The electric machine according to claim 1 further comprising in that the first end wall (14) has air openings (52) for the outer cooling air flow (B) in an outer edge region (50) radially protruding over the adjacent circumferential wall (12).

5. The electric machine according to claim 1 further comprising in that the inner cooling fan impeller (20) is formed as a radial or diagonal impeller such that the inner cooling air circuit (A) passes through axial cooling channels (54) of the rotor (10), over the inner cooling rib geometry (30) of the first end wall (14), through gaps of the rotor (4) formed between a stator core (24) and stator windings (26), and over an additional cooling rib geometry (56) on the inner side of the second end wall (16).

6. The electric machine according to claim 1 further comprising in that the inner cooling rib geometry (30) of the first end wall (14) is formed at least partially from pin-type, axially projecting cooling projections (58).

7. The electric machine according to claim 1 further comprising in that the inner cooling fan impeller (20) is disposed on the side of the rotor (10) facing towards the first end wall (14).

8. The electric machine according to claim 1 further comprising in that the cooling projections (44, 46, 48, 58) of the first or the second end wall (14, 16) is formed with a cross-section tapering towards its free end, so that the respective end wall (14, 16) can be manufactured as a die-cast metal part.

9. The electric machine according to claim 8, further comprising in that the cooling projections (44, 46, 58) have a length-width ratio (l:b) with respect to their cross-section in the range between 0.8 and 1.5.

10. The electric machine according to claim 1, further comprising in that the wing-shaped rib projections (48) have a length-width ratio (l:b) with respect to their cross-section in the range between 1.5 and 6.0.

11. The electric machine according to claim 1, further comprising the cooling projections have a pin-type form.

* * * * *